United States Patent
Agarwal et al.

(10) Patent No.: US 9,250,970 B2
(45) Date of Patent: Feb. 2, 2016

(54) METHOD AND SYSTEM FOR MANAGING APPLICATIONS ON HOME USER EQUIPMENT

(75) Inventors: Sachin Agarwal, Heidelberg (DE); Daniele Abbadessa, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 114 days.

(21) Appl. No.: 14/125,385

(22) PCT Filed: Jun. 6, 2012

(86) PCT No.: PCT/EP2012/060666
§ 371 (c)(1),
(2), (4) Date: Jan. 22, 2014

(87) PCT Pub. No.: WO2012/168283
PCT Pub. Date: Dec. 13, 2012

(65) Prior Publication Data
US 2014/0137132 A1 May 15, 2014

(30) Foreign Application Priority Data

Jun. 10, 2011 (EP) .................................. 11004738

(51) Int. Cl.
*G06F 9/45* (2006.01)
*G06F 9/50* (2006.01)

(52) U.S. Cl.
CPC ............ *G06F 9/5027* (2013.01); *G06F 9/5044* (2013.01); *G06F 9/5072* (2013.01); *G06F 2209/509* (2013.01); *G06F 2209/5017* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| | | | |
|---|---|---|---|
| 7,716,662 B2* | 5/2010 | Seiden | 717/173 |
| 2002/0049579 A1 | 4/2002 | Gates et al. | |
| 2004/0216096 A1 | 10/2004 | Messer et al. | |
| 2010/0064335 A1 | 3/2010 | Jenkin et al. | |
| 2010/0131590 A1 | 5/2010 | Coleman et al. | |

OTHER PUBLICATIONS

International Search Report, dated Nov. 2, 2012, from corresponding PCT application.

* cited by examiner

*Primary Examiner* — Chuck Kendall
(74) *Attorney, Agent, or Firm* — Young & Thompson

(57) ABSTRACT

A system and method for managing an application on a home user equipment, preferably a set-top-box of a television, the method includes the steps of:
a) dividing the application into at least one separate executable application part,
b) determining for each separate executable application part whether to be executed on the home user equipment or on a computational entity, located in the internet,
c) transferring application parts determined for execution on the computational entity according to step b) to the computational entity,
d) executing transferred application parts on the computational entity,
e) returning results of executed application parts to the home user equipment, and
f) synchronizing returned results with results of separate application parts executed on the home user equipment.

13 Claims, 10 Drawing Sheets

Example: A user selects a VoD program stored on his Tivo (via remote control/EPG) and the associated video stream and IMDB reviews twitter posts related to the selection are mixed and displayed to the user.

Implementation logic

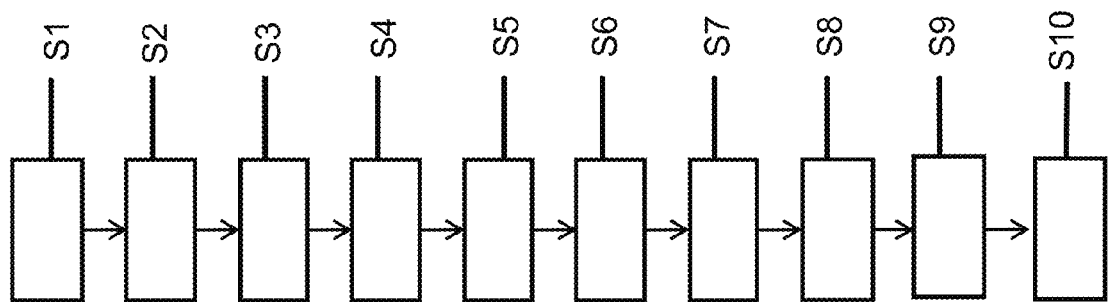

METHOD AND SYSTEM FOR MANAGING APPLICATIONS ON HOME USER EQUIPMENT

The invention relates to a method for managing an application on a home user equipment, preferably a set-top-box of a television.

The present invention relates also to a system for managing an application on a home user equipment, preferably for executing a method according to one of the claims 1-11.

Although applicable in general to home user equipment, the present invention will be described with regard to a set-top-box for a television as home user equipment.

Conventional television content delivery systems distribute television content among a plurality of users via electronic communication means. The content may be any audio and/or video content or accompanying informational content, such as the electronic program guide EPG. Such a conventional television content delivery system is shown in FIG. 1. From a source, operated by a corresponding content provider 101, content is transmitted via transport service providers such as digital IP TV providers 106, satellite television providers 107 and/or cable television providers 109. Such service providers 106, 107, 109 may then use a combination of standard and non-standard data transport technologies to deliver content to users 108 subscribing the content.

For example, in case of IP TV, cable television and satellite television, users such as a family 111 in a home subscribe to one or more of these service providers 106, 107, 109 in order to receive the content. The service providers 106, 107, 109 supply users 111 with a set-top-box 105 prior to receiving the content that is able to decipher or decrypt specific-encoded content sent by the corresponding service provider 106, 107, 109 into a format suitable for example for displaying on a user's television 104. Recently upcoming television sets 102 may have in-built-set-top-boxes in which case the service provider 106, 107, 109 provides authentication credentials. The users 111 may then use these credentials to operate the in-built-set-top-box. Some service providers 106, 107, 109 may also allow interaction by providing a back-channel 113 from the user 111 to the content provider 101. For example a user may then use a remote control 114 to send control messages to the content provider 101 via the service provider 106, 107, 109. These control messages may then be used to control the content provided by the content provider 101 to the user 111.

A conventional set-top-box to decipher specific-encoded content by a service provider 106, 107, 109 is shown in FIG. 2.

A set-top-box 201 receives encoded content via data input/output ports 202 and outputs an audio and/or visual signal suitable for viewing with a television via its audio/visual output port 203. The set-top-box 201 further comprises a user input interface 204 with which for example via a wireless remote control actions of the set-top-box 201 may be controlled, for example adjusting the loudness of the audio signal, a television program switch or the like. The set-top-box 201 usually comprises a digital right management manager 205 used to decode ciphered or encrypted data from the service provider 106, 107, 109. Conventional digital rights management managers 205 are implemented as a hardware module in order to prevent a tampering and/or unauthorized access to audio/video content.

The set-top-box 201 comprises further a processor CPU and memory 208 for running an application on the set-top-box, for example a decipher-application, etc. A controller 206 in the set-top-box 201 coordinates overall functioning of the different components 202-215 of the set-top-box 201. A user interface engine 207 is responsible for the user interface, for example menues or the like, presented to the user. Such user interfaces may for example be implemented in form of limited web-browsers. Further conventional set-top-boxes 101 may support additional downloadable software applications 209, wherein these software applications then usually provide their output to the user interface. As an example electronic program guide information, displaying information about television program schedules is conventionally implemented as software application 209.

High-end conventional set-top-boxes 201 also include local non-volatile storage 213 for storing video and/or informational content and/or software applications. Such a persistent storage 213 may also be used to implement a personal video recorder (PVR) for the user 101, in particular to provide time-shift-viewing of television programs. To present audio/video content to the user a video decoding unit 211 takes as input audio/video content from the digital rights management manager 205 or from the persistent storage 213 and decompresses it. Output from the user interface engine 207 is then overlaid on top of the decompressed video/audio content via a multiplexing renderer 212. A hardware abstraction layer 214 then converts the audio/video output from the multiplexing renderer 212 into signals suitable for conventional televisions. The hardware abstraction layer 214 also converts user control signals sent to the set-top-box 201, for example via a remote control 114 into messages to be processed by the user interface engine 207.

However, conventional home user equipment in particular in form of a set-top-box suffers significant disadvantages.

One of the disadvantages is that most service providers provide media content in a non-standard inaccessible and encoded format, making it unsuitable for mixing it with other information of other content providers. A further disadvantage is, that most home user equipment in particular set-top-boxes have a very limited ability to execute or install complex applications because of they are designed for the end-consumer market; therefore have to be low-cost. An even further disadvantage is, that different set-top-boxes of different service providers result in a overall heterogeneous content delivery architecture and capabilities among different users, which further results in high costs and a limited ability to provide additional services for a plurality of users. Conventional set-top-boxes are normally equipped with hardware implemented software applications, making it necessary to replace an "old" set-top-box with a newer one when the service provider would like to provide enhanced or additional services, even in case of updates. One of the further disadvantages is, that home user equipment works in general only well with a specific content presenting means.

In US 2010/0064335 A1 so-called virtual set-top-box is shown which emulates hardware capabilities of a physical set-top-box to process IPTV content. However, this requires for example complicated respectively complex hardware and software like a personal computer to emulate a set-top-box via a software application. Conventional personal computers are too big, too loud and consume too much energy to be used in a home user environment, for example next to a television when viewing video content via the personal computer on a television. Further the user has to control and monitor a running virtual set-top-box on his personal computer which need a lot of user interaction in particular before and during viewing video content. Therefore implementing such a virtual set-top-box on a general purpose personal computer reduces significantly system reliability while increasing a risk of security breaches via unauthorized access to copyright-protected media content.

It is therefore an objective of the present invention to provide a method and a system for managing an application on a home user equipment, which are more flexible than conventional methods and systems in particular with regard to processable services.

It is a further objective of the present invention to provide a method and a system for managing an application on a home user equipment, which are easier to implement and require less user interaction to be able to present media content for the user without deteriorating security of protected content.

It is an even further objective of the present invention to provide a method and a system for managing an application in a home user equipment which may be more easily provide further services which are in particular not implemented when a user buys the home user equipment in a retail store.

It is an even further objective of the present invention to provide a method and system for managing an application on a home user equipment allowing flexible interconnection of different media content presenting means reaching in particular from mobile phones via tablets to beamers and conventional televisions.

In accordance with the invention the aforementioned objectives are accomplished by the method of claim 1 and a system according to claim 12.

According to claim 1 the method for managing an application on a home user equipment preferably a set-top-box of a television is characterized by the steps of
  a) Dividing the application into at least one separate executable application part,
  b) Determining for each separate executable application part whether to be executed on the home user equipment or on a computational entity, located in the internet,
  c) Transferring application parts determined for execution on the computational entity according to step b) to the computational entity,
  d) Executing transferred application parts on the computational entity,
  e) Returning results of executed application parts to the home user equipment, and
  f) Synchronising returned results with results of separate application parts executed on the home user equipment.

According to claim 12 the system for managing an application on a home user equipment, preferably for executing a method to one the claims 1-11, comprising a home user equipment, preferably a set-top-box of a television and a computational entity, located in the internet, comprising each an input interface and an output interface for communication with each other.

According to claim 12, the system is characterized in that the computational entity comprises a task divider for dividing the application into separate executable application parts and for determining for each separate executable application part whether to be executed on the home user equipment or on the computation entity, communication means for transferring application parts determined for execution on the computational entity to the computational entity via the input and output interfaces and for returning results of executed application parts to the home user equipment via the input and output interfaces, a processor for executing transferred application parts on the computational entity, and a synchronizer for synchronising returned results with results of separate application parts executed on the home user equipment.

According to the invention it has first been recognized that the method according to claim 1 and the system according to claim 12 provide the ability for execution of more complex applications on home user equipment.

According to the invention it has further first been recognized that the method according to claim 1 and the system according to claim 12 provide a more easier incorporation of further components and/or subsystems for future use on the home user equipment.

According to the invention it has further been first recognized that the method according to claim 1 and the system according to claim 12 allow an efficient sharing of resources when providing media content thus saving energy.

According to the invention it has further been first recognized that the method according to claim 1 and the system according to claim 12 provide a high level of security for protected media content while enhancing the flexibility for processing content of different service providers.

According to the invention it has further been first recognized that the method according to claim 1 and the system according to claim 12 needs lesser user interaction while enabling to provide more complex and more applications.

Further features, advantages and preferred embodiments are described in the following subclaims.

According to a preferred embodiment identical application parts transferred to the computational entity from different home user equipment are identified, wherein one of the identical application parts is executed by the computational entity and a result of this execution of the one identical application part is returned to each of the different home user equipment. This enhances the economic viability by deploying unique copies of complex software applications on the computational entity for each home user equipment. For example making computational entity resources available on a per home user equipment basis would be very expensive. By identifying identical application parts and executing one of the identical application parts and finally transferring identical results back to each home user equipment the amount of computational entity resources needed for performing the application is significantly reduced.

According to a further preferred embodiment identical application parts are identified by identical inputs and identical execution information, preferably execution code. This enables a reliable identification of identical application parts to be executed in the computational entity located in the internet. It is further possible to implement a requirement depending on the application part, whether identical application parts start executing at the same time, i.e. within a given time period to avoid time lag. This provides fast replication of results or outputs of identical application parts across different home user equipment. It is possible that two identical separate executable application parts may correspond to different applications and different home user equipment.

According to a further preferred embodiment at least one of the steps a)-c) includes analyzing a source code of the application. This allows a reliable division of an application into smaller separate executable components respectively application parts. A further advantage is that the division may be performed based on preferences, for example the source code may be analysed in terms of integer and/or floating point performance and then assigned to a suitable subcomponent of the computational entity. An even further advantage is, that these divided components may be analyzed for example for cycles in the execution.

According to a further preferred embodiment at least one of the steps a)-c) includes analyzing a data flow of the application. This allows a reliable division of the application into separated executable application parts, for example by identifying a cycle during execution of the application and combing cycles within one separate executable application part. This minimizes data exchange between separate executable application parts in particular if data exchange is necessary between a component running on the home user equipment and another separate executable application part running on the computational entity. Further, network latency between the computational entity and the home user equipment is avoided respectively minimized.

According to a further preferred embodiment computational requirements of an application for execution on the home user equipment are identified and separate executable application parts exceeding solely or cumulatively computational requirements of the home user equipment are determined for execution on the computational entity. This optimizes for example the use of resources of the home user equipment and the computational entity: Only these separate executable application parts which are alone or together with other separate executable application parts above the computational requirements of the home user equipment are transferred to the computational entity for execution. This avoids unnecessary transfer to application parts and resources on the computational energy on the one hand and on the other hand resources of the home user equipment are used in an optimized way without overloading the home user equipment.

According to a further preferred embodiment step b) includes determining a local parameter indicating a physical requirement to be executed on the home user equipment. This enables to determine whether to execute separate executable application parts on the home user equipment or on the computational entity. For example a separate executable application part in form of an image buffer writing out a visual output of the separate executable application part needs to be a part of the home user equipment therefore the corresponding separate executable application part must be executed on the home user equipment.

According to a further preferred embodiment an output of a first application part is used as input for a second application part executed on the computational entity, preferably wherein the first and second application part correspond to different applications on separate home user equipment. This allows an implementation of a composition of several further functions: If for example an output of a first function is used as input for further functions, not only further functions may be provided by also recalculation of outputs for the further functions is avoided resulting in an even more efficient use of computational resources of the computational entity. Such a use may be performed for example via copying a memory storing an output into next functional components as input and/or through network protocols such as multicast depending on whether functional components are executed on the same physical computational entity or not.

According to a further preferred embodiment the home user equipment provides connector means for enabling an entire application to be executed on the computational entity. In this way the computational entity provides an addition or removing of corresponding connector components or means enabling the entire application execution on the computational entity. For example if a complete application is moved from the home user equipment to the computational entity then an output of the application may be streamed to the home user equipment. The connecting means are then for example a stream encoder and a network streamer application in the home user equipment to enable this functionality together with a corresponding stream receiver decoding such a stream to the home user equipment as required.

According to a further preferred embodiment separate executable application parts are provided with common data input and data output ports. The term "common" with regard to data input and data output ports means standard data input and data output ports providing are an easier data exchange between separate executable application parts.

According to a further preferred embodiment of the system according to claim 12 the computational entity further comprises a multiplexer for mixing input and results of separate executable application parts. Such a multiplexer is preferably used to mix outputs of applications, content and user input. The multiplexer for example creates a unified data stream from different sources which can be transmitted to the home user equipment for further processing and/or rendering at user premises.

There are several ways how to design and further develop the teaching of the present invention in an advantageous way. To this end it is to be referred to the patent claims subordinate to patent claim 1 and subordinate to patent claim 12 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained.

In the drawing

FIG. 10 shows task division and synchronization of a cloud-computing data-center operation with a set-top-box operation according to a seventh embodiment of the present invention.

Figure 1:
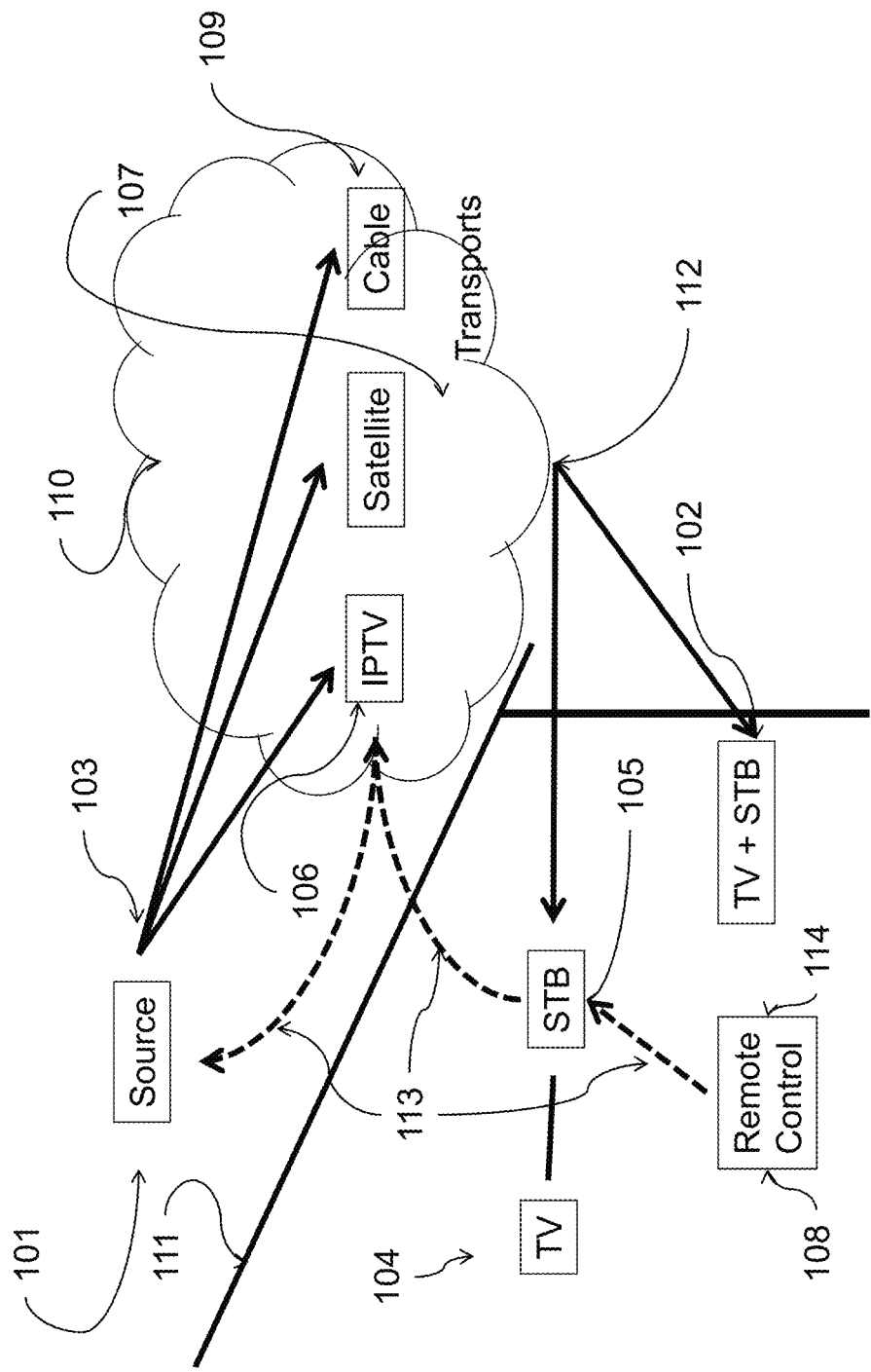
FIG. 1 shows a schematical view of a conventional television content delivery system.

In FIG. 1 a conventional television content delivery system is shown. A content provider 101 provides media content to multiple transport service providers, such as digital IPTV providers 106, satellite television providers 107 and cable television providers 109. These service providers 106, 107 and 109 use a combination of standard and non-standard data transport technologies to deliver the media content to subscribing users 108. For example in case of IPTV, cable television and satellite television users such as a family 111 in a home subscribe to one or more of these service providers 106, 107 and 109 in order to obtain the media content. The service providers supply users with a non-standard set-top-box 105 equipped and authorized to decipher specific-encoded media content sent by the service provider 106, 107 and 109 into a format suitable for displaying on the user's television 104. Some more modern television sets 102 have in-built set-top-boxes in which case the service provider 110 provides authentication credentials to users 111 who may then use these credentials to operate the in-built set-top-box. Some service providers 106, 107 and 109 allow interactive programming by providing a back channel 113 from the user 111 to the content provider 101. The back channel 113 is a communication medium enabling communication from the user 111 to the content provider 101. For example a user may then use a remote control 114 to send control messages to the content provider 101. The control messages are used to control the media content transmitted to the user 111.

Figure 2:
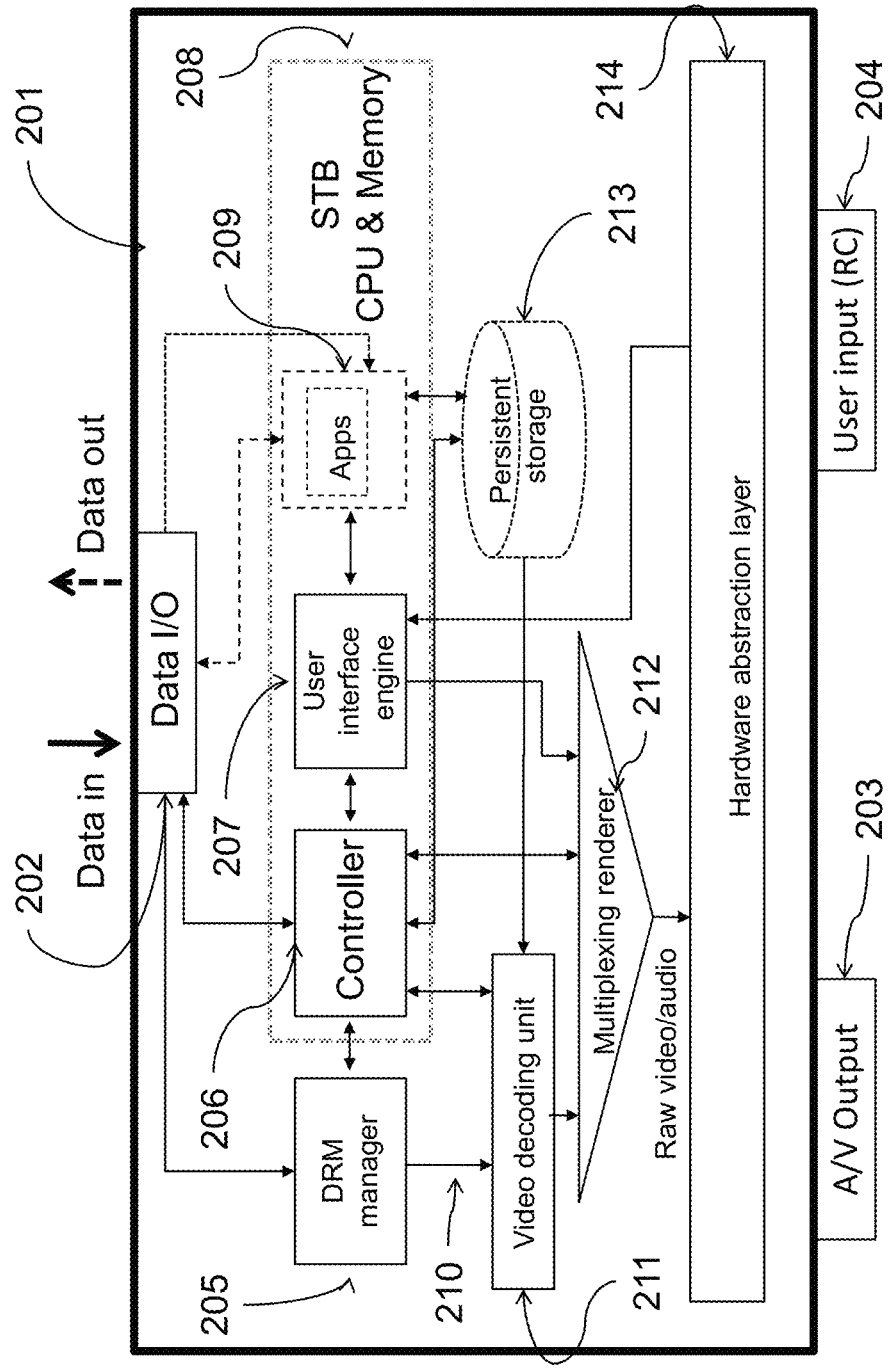
FIG. 2 shows a schematical view of a conventional set-top-box and corresponding components.

FIG. 2 shows a schematical view of a conventional set-top-box and corresponding components.

In FIG. 2 a conventional set-top-box 201 receives encoded media content data via its data I/O component 202 and outputs and audio/visual signals suitable for viewing with a television via A/V output 203. The set-top-box 201 also receives user input, for example via a wireless remote control port 204. This input is then used to control actions of the set-top-box 201. Further the set-top-box 201 comprises a digital rights management manager 205 used to decode the encrypted media content data received via the data I/O component 202. To prevent tampering and/or unauthorized actions to video/audio content the digital rights management manager 205 is usually implemented as a hardware module.

The set-top-box 201 further comprises a central processing unit CPU and memory 208 which is used to run applications on the set-top-box 201. A controller 206 orchestrates respectively controls an overall functioning of the set-top-box 201. A user interface engine 207 is responsible for a corresponding user-interface, for example menus presented to the user 111. Such a user-interface engine 207 may for example be implemented by limited web-browsers. If for example the set-top-box 201 supports additional downloadable software applications 209, these software applications 209 deliver their output to a user-interface engine 207. For example the electronic program guide EPG displaying information about television program schedules is implemented in conventional set-top-boxes 201 as software applications according to this manner.

Further, the conventional set-top-box 201 may further comprise persistent storage 213 which may be used as a local non-volatile data storage. Video and informational content as well as software applications may be stored here and retrieved at a later time, for example if the set-top-box 201 is turned-off in between. The conventional set-top-box 201 may further comprise a video decoding unit 211 which takes as input compressed audio/video content from the digital rights management manager 205 or the persistent storage 213 and decompresses it. Output from the user interface engine 207 is overlaid on top of the video signal via a multiplexing renderer 212. A hardware abstraction layer 214 then converts the audio/video output from the multiplexing renderer 212 into a signal suitable for television. Further the hardware abstraction layer 214 converts user control signals received via the wireless remote control port 204 into messages which can be handled by the user-interface engine 207.

Figure 3:
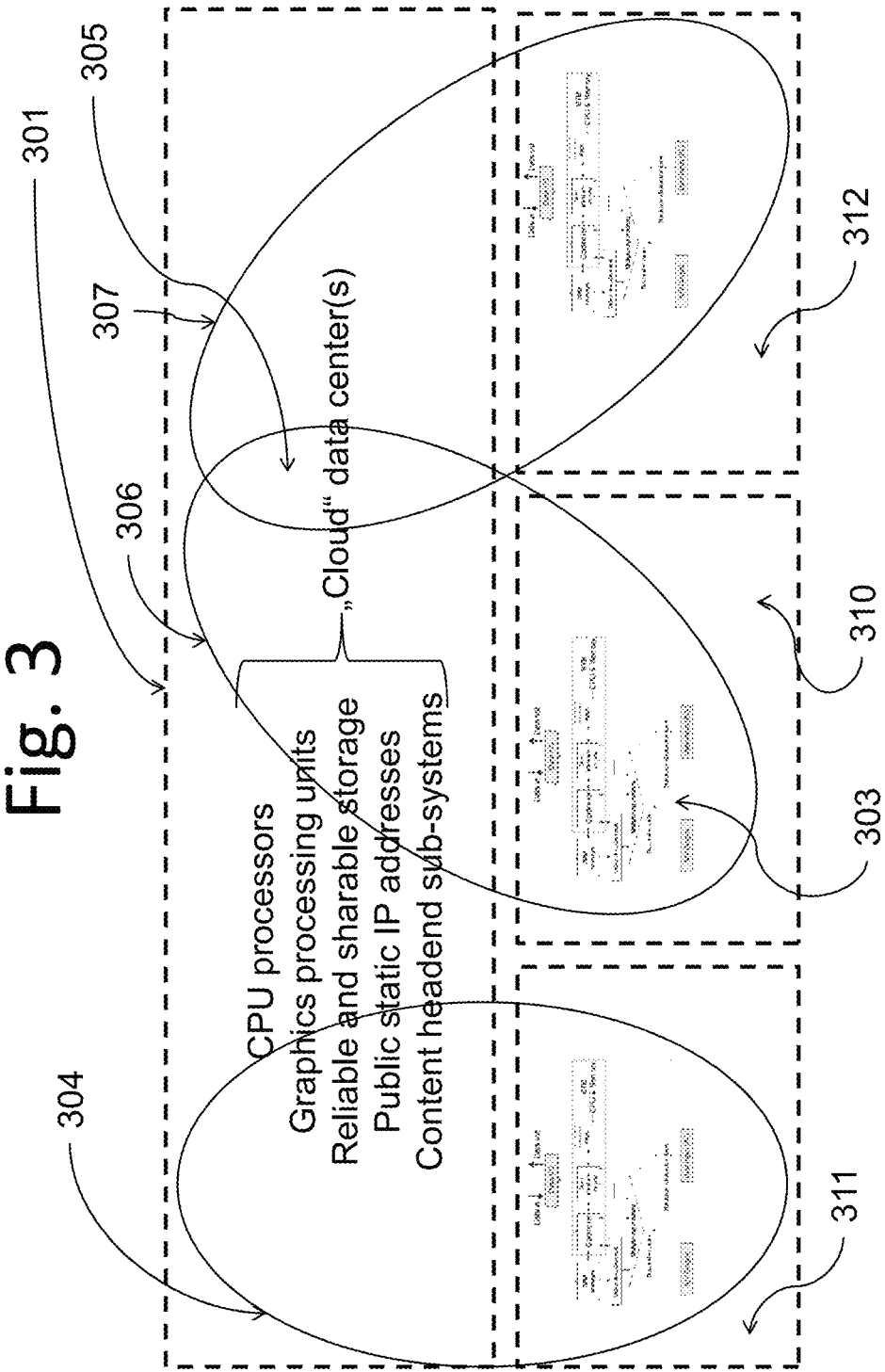
FIG. 3 shows a computational entity in form of a cloud-computing data-center.

FIG. 3 shows a computational entity in form of a cloud-computing data-center.

In FIG. 3 a computational entity in form of a cloud-computing data-center 301 is shown. Further different user premises 310, 311, 312 are shown. Each user has a set-top-box 303 in his premises 310, 311, 312. Further reference signs 304, 306 and 307 denote so called cloud-set-top-box CSTB, denoted with 304, 306 and 307, incorporating facilities of the cloud-computing data-center 301 and those of the corresponding set-top-box 303 in the corresponding user premises 310, 311 and 312. The cloud data-center 301 comprises central processing unit processors, graphic processing units, sharable storage, public static IP addresses and/or content head-end sub-systems.

For performing the method according to the invention a CSTB instance is established being a temporary entity that exists for the duration required by a software application or applications deployed on it. The cloud-set-top-box 304, 306 and 307 may be a geographically distributed entity existing partly on the corresponding set-top-box 303 in the user premises 310, 311 and 312 and partly in the cloud-computing data-center 301. Although each cloud-set-top-box instance is unique for each corresponding set-top-box 303 in each of the user premises 310, 311 and 312 the cloud-computing data-center 301 enables efficient sharing of resources when possible. Such an example is denoted with reference sign 305 showing overlapping cloud-set-top-box regions 305. For example in the case of two ore more cloud-set-top-boxes instances 306 and 307 are tasked by software applications to perform identical tasks then the corresponding identical task located in overlapping region 305 is performed only once and its output is presented to both or further corresponding cloud-set-top-boxes 306 and 307.

The cloud-set-top-box or cloud-set-top-box instance 304, 306 and 307 provides the user to access a platform where multiple or complex applications may be deployed and consumed by users and service providers. The user using set-top-box 303 does not recognize that a cloud-set-top-box instance from the application of its set-top-box 303 is established to the cloud-computing data-center 301 hiding the distributed nature of the cloud-set-top-box 304, 306 and 307. Instead in particular unified capabilities of the set-top-box 303 and the cloud-computing data-center 301 to each application running on the set-top-box 303 are presented thereby allowing to perform complex tasks without being aware of where these tasks are executed, namely at the set-top-box 303 or in the cloud-computing data-center 301.

In particular an entire application may be executed in the cloud-computing data-center 301 and the result of this execution output is shared among a plurality of cloud-set-top-boxes 304, 306 and 307. Another option is to identify some components of the application on the set-top-box 303 and their outputs are shared among the cloud-set-top-box instances 304, 306 and 307 and not the whole application.

Figure 4:
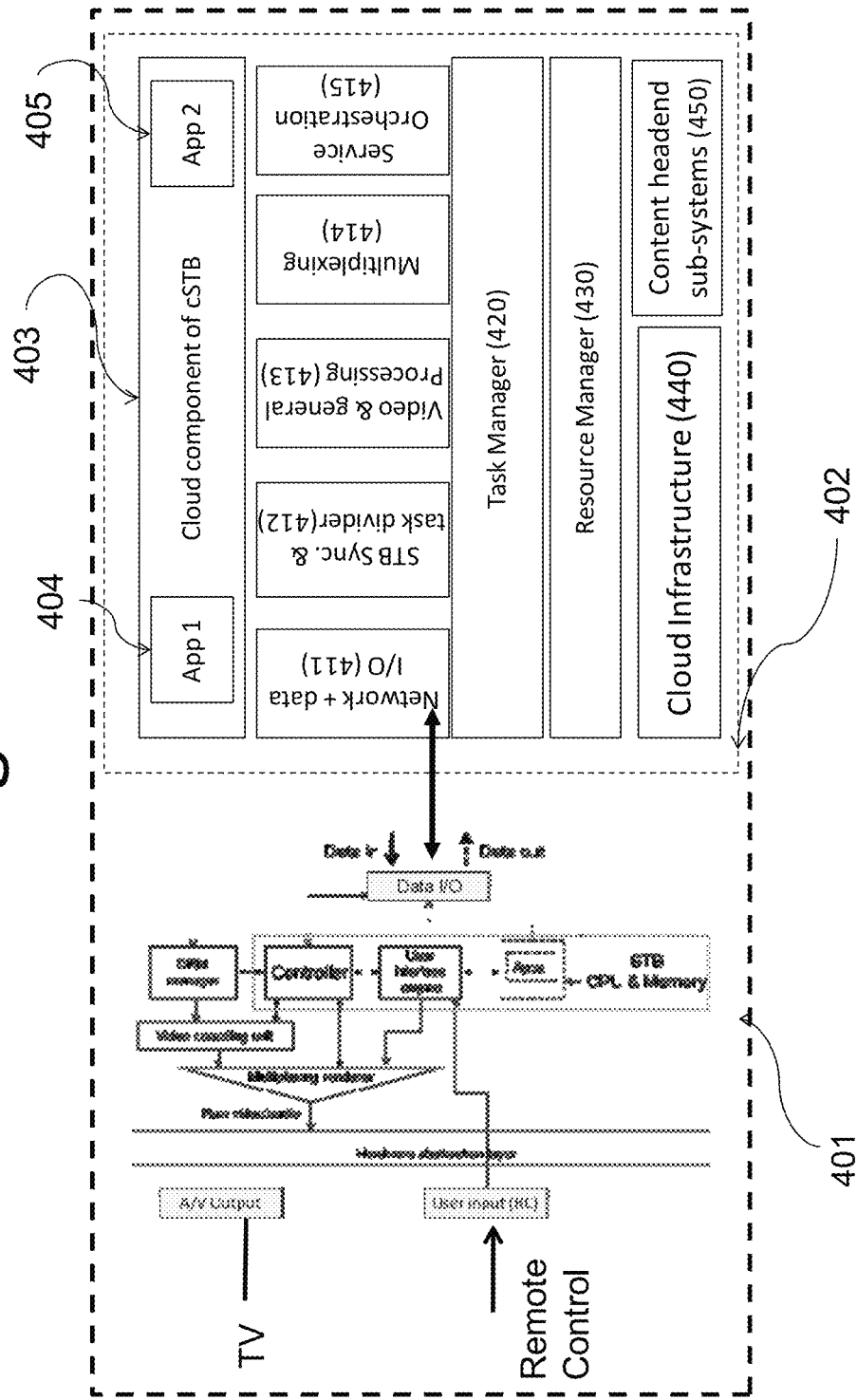
FIG. 4 shows a system according to a first embodiment of the present invention.

FIG. 4 shows a system according to a first embodiment of the present invention.

In FIG. 4 is shown an instance of a cloud-set-top-box comprising the set-top-box 401 in the user premises and a cloud component 403. The cloud component 403 is capable of hosting all or parts of applications 404, 405 which are for example implemented as software programs providing advanced functionality. The cloud component 403 of the cloud-set-top-box instance invokes a cloud controlling middleware 402 via an application programming interface API in order to utilize the capabilities of the cloud computer data-center according to FIG. 3. The cloud controlling middleware 402 comprises the following components:

A network and a data input/output component 411 providing applications with mechanisms to communicate with the set-top-box 401 in the user premises and to obtain media content from content providers via so called content head-end sub-systems in the cloud-computing data-center 301. Further the network and data input/output component 411 receives user input from the set-top-box 401 and transfers the user input to the applications 404, 405.

Further the cloud controlling middleware 402 comprises a set-top-box synchronizer and a task divider component 412. This component 412 synchronizes actions of the cloud component 403 with the set-top-box 401 in the user premises. For example the component 412 may delegate and synchronize some tasks to the set-top-box 401 depending on computational requirements or capabilities of the set-top-box 401 and other tasks to the cloud-computing data-center 301. The component 412 comprises a database for storing abilities of all deployed set-top-box models and/or versions and may use this information to distribute the tasks among different components of a cloud-set-top-box. Further this component 412 may detect duplicate task requests from different cloud-set-top-box instances, schedules an execution of only one task and copies the output of the executed task to each requesting cloud-set-top-box instance.

A video and general processing component 413 in the cloud controlling middleware 402 exposes capabilities of the cloud-computing data-center 301 in processing video data and information. The cloud-computing data-center 301 may provide specialized hardware to process video data, for example by providing hardware audio/video transcoders, graphical processing units or the like. This capability information may be provided to application software developers via an application programming interface API.

A multiplexing component 414 in the cloud controlling middleware 402 is used to mix outputs of applications or separate executable parts of them, content and user input. The multiplexing component 414 creates a unified data stream from the different outputs of the applications or separate executable parts of them, of content and user input which may then be transmitted to the set-top-box 401 for further processing and/or rendering at user premises.

A service orchestration component 415 is operable to coordinate interaction of different applications running on the cloud-set-top-box instance 403.

A task manager 420 in the cloud controlling middleware 402 collects all tasks requests from for example applications or application parts and schedules them for example according to priority and/or fairness. The task manager 420 further controls the overall lifecycle of each cloud-set-top-box instance including for example authentication, access control, billing and state-link-advertisement management.

A resource manager 430 is operable to check the underlying cloud-computing infrastructure resources and keeps real-time information about resource availability in the cloud-computing data-center 301. This information is then used by the task manager 420 to accept or deny requests from applications respectively in general from higher layers. Further the resource manager 430 requests resources from the cloud-computing data-center 301 as demanded by the task manager 420.

Further a content head-end sub-system 450 is responsible to distribute the unified data stream from the multiplexing component 414 to the set-top-box 401.

Figure 5:
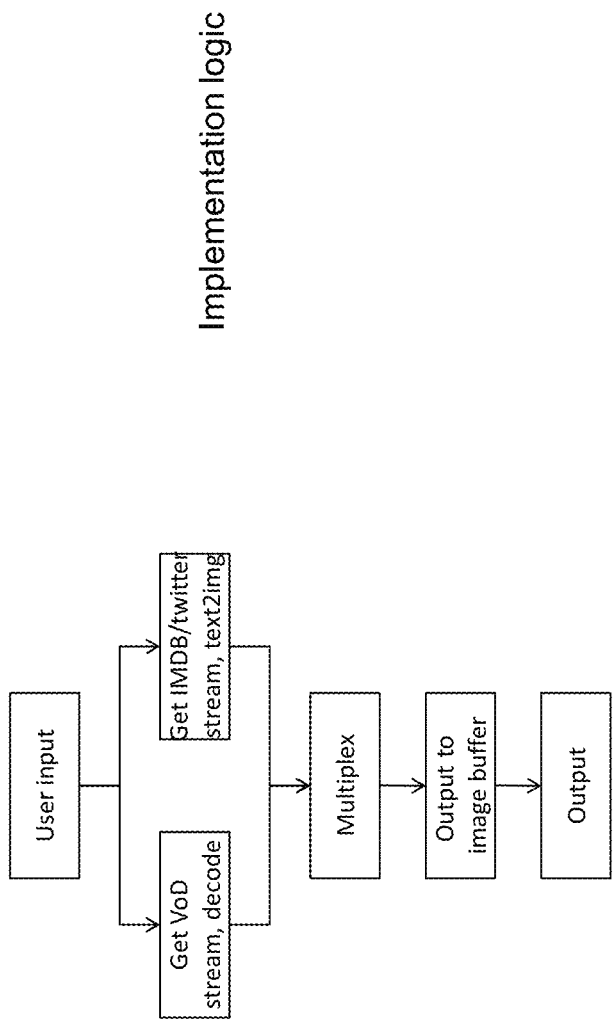
FIG. 5 shows a flowchart of the method according to a second embodiment of the present invention.

FIG. 5 shows a flowchart of the method according to a second embodiment of the present invention.

FIG. 5 shows a flowchart of an application taking as input a user requested video. A user for example selects a video on demand (VoD) program stored on his personal video recorder (PVR) via a remote control or an electronic program guide. After the user input the application gets the video on demand program, streams and decodes it. Further information in form of image movie database (IMDB) reviews and/or related twitter posts or other comments in social networks related to the video on demand program are obtained and converted into image and/or video data and streamed into an information stream. The decoded video on demand stream together with the converted information stream is mixed in a multiplexer and the mixed stream is delivered to the image buffer and—via the image buffer output and a display—presented to the user.

Figure 6:
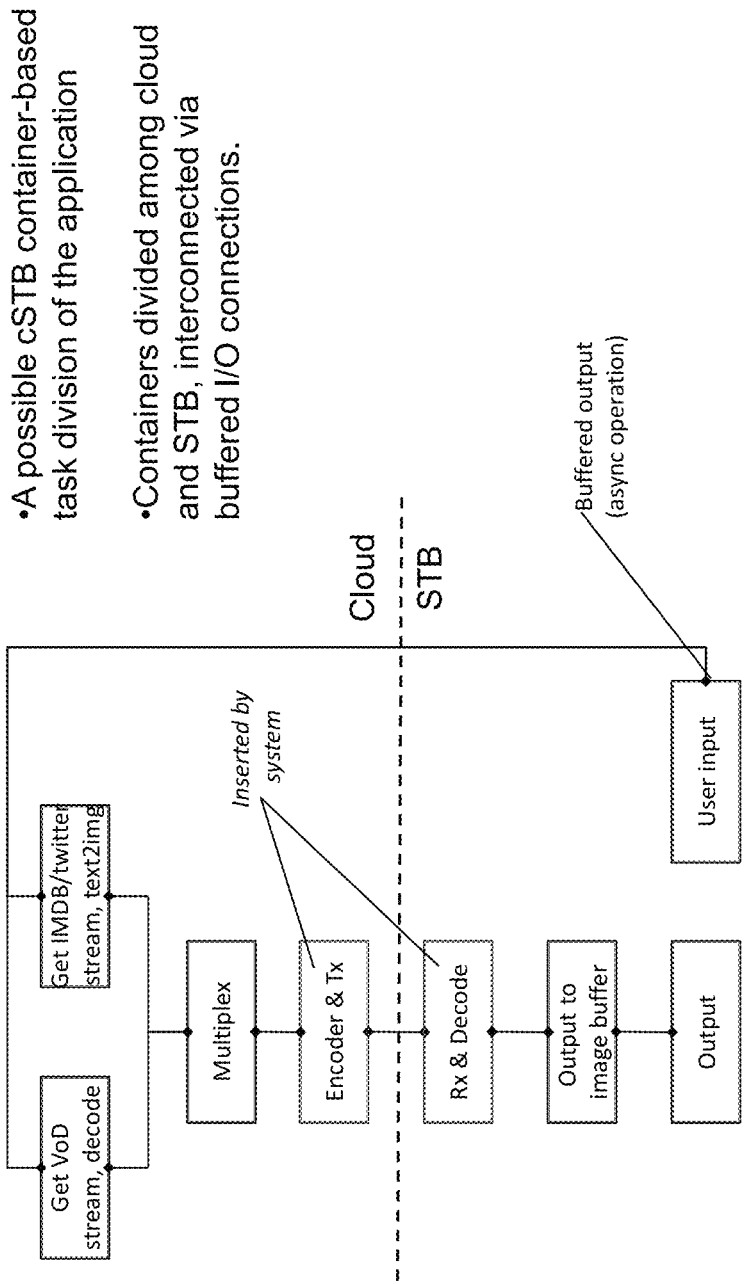
FIG. 6 shows a method according to a third embodiment of the present invention.

FIG. 6 shows a method according to a third embodiment of the present invention.

In FIG. 6 an application according to FIG. 5 is shown, wherein the application is divided into separate executable application parts and wherein some application parts are executed on the set-top-box STB and some are executed on the computational entity CLOUD.

In FIG. 6 the separate executable application part of user input is executed on the set-top-box STB. This user input is transmitted to the separate executable application part on a cloud-computing data-center CLOUD responsible for obtaining and decoding the video on demand program according to the user input and to another separate executable application part responsible for obtaining image movie database information and social network comments and for the subsequent converting of the information and the comments into streams, for example by providing text-to-image conversion. The multiplexing of these two streams, namely the video on demand stream and the converted social network/image movie database stream is performed in the cloud-computing data-center CLOUD. For data communication between the cloud-computing data-center cloud and the set-top-box STB encoder and decoder means for transmission and reception of data are inserted so that the multiplexed streams may be encoded and transmitted from the cloud-computing data-center cloud to the set-top-box STB which receives and decodes the received stream.

That received stream is then further transferred for output to the image buffer and outputted respectively displayed or presented to the user. The tasks are put into separate executable application parts divided among the cloud-computing data-center CLOUD and the set-top-box STB which interconnected via buffered input/output connection.

FIG. 6 therefore shows an application divided into different components and these components are divided between the cloud-computing data-center cloud and the set-top-box STB for execution. Further encoder and decoder means are inserted to provide a standardized data communication or data exchange between application parts in the cloud-computing data-center CLOUD on the one hand and the set-top-box STB on the other hand FIG. 7 shows a data flow between different components according to a fourth embodiment of the present invention.

Figure 7:
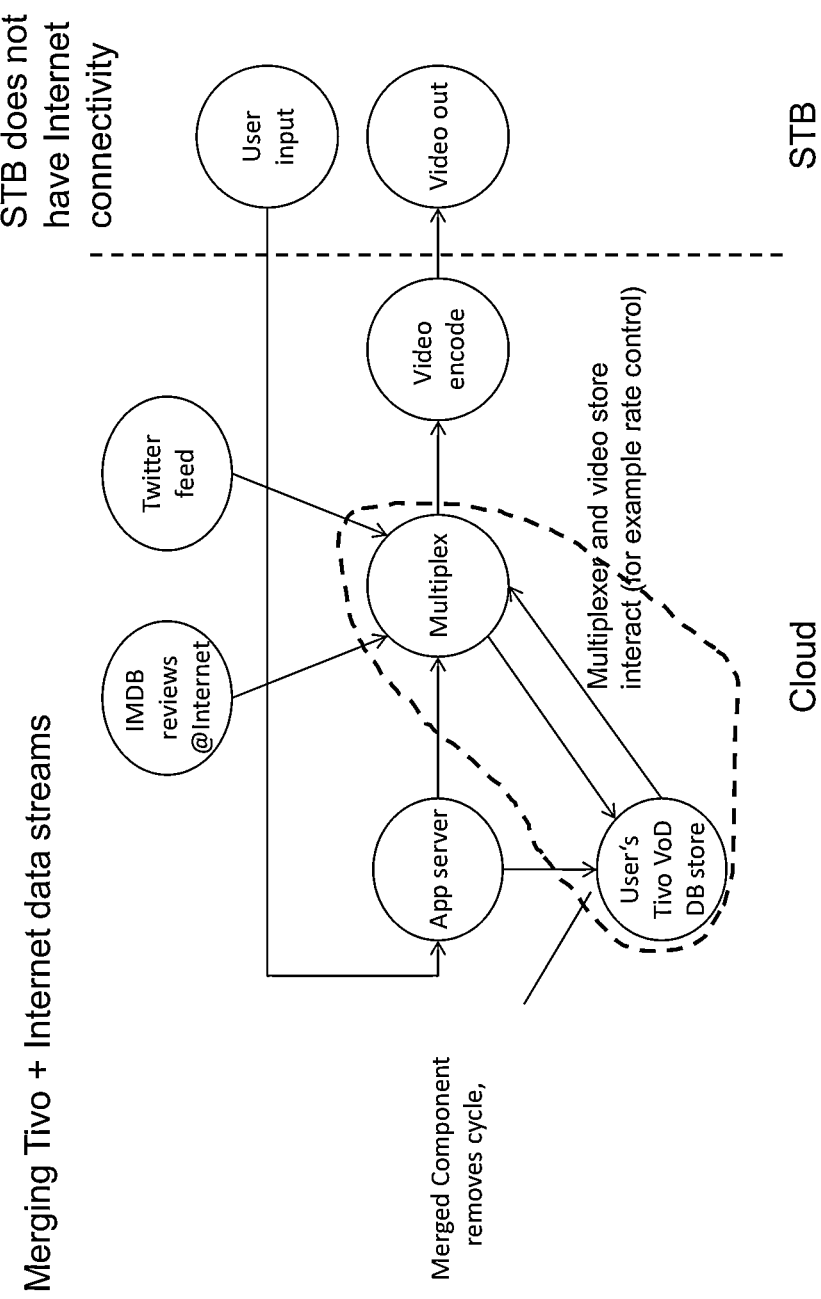
FIG. 7 shows a data flow between different components according to a fourth embodiment of the present invention.

FIG. 7 shows a data-flow between different separate executable application parts according to the application of FIG. 5 and FIG. 6 with a cycle due to multiple interactions of the multiplexer, denoted as Multiplex, with the video store, for example for rate control and/or look ahead. For example user input is transmitted from the set-top-box STB to an application server in the cloud-computing data-center CLOUD. The application server connects to the user's personal video recorder in form of a TV video on demand database store for obtaining the video on demand stream from this store. Further the multiplexer combines the video on demand stream and the image movie database reviews and social network comments like Twitter feed or the like For rate control the multiplexer may interact with the video source in form of the user's personal video recorder. The video data is then encoded by the encoder and transmitted to the set-top-box STB where it finally is presented to the user. This interaction between the multiplexer and the personal video recorder is merged together in a single vertex in a graph representing data-flow providing a directed acyclic graph DAG, which is further described in FIG. 10.

Figure 8:
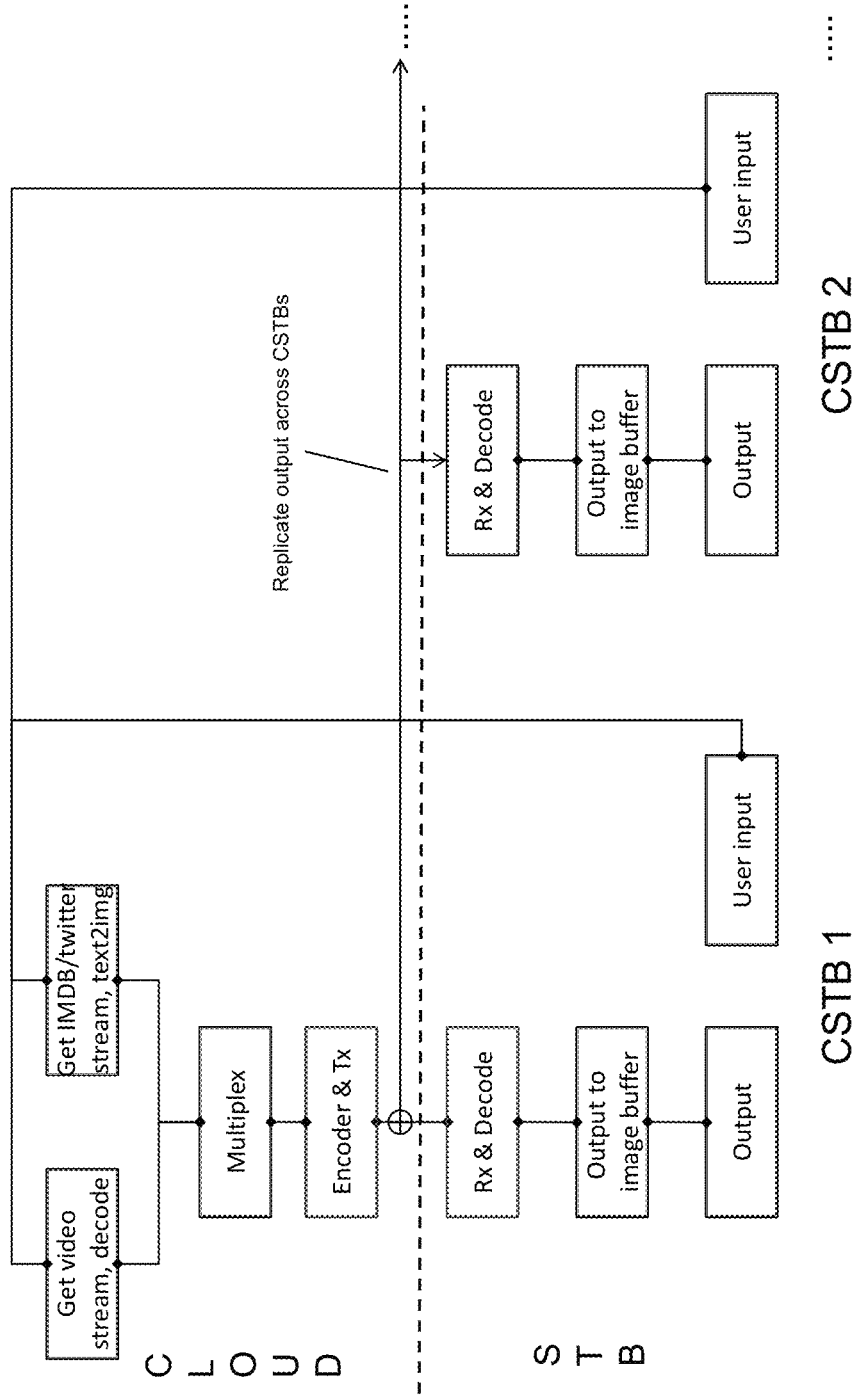
FIG. 8 shows a task sharing of separate executable application parts according to a fifth embodiment of the present invention.

FIG. 8 shows a task sharing of separate executable application parts according to a fifth embodiment of the present invention.

FIG. 8 illustrates a sharing of output of identical separate executable application parts of different cloud-set-top-boxes instances CSTB1 and CSTB2 for an application according to FIG. 6. For example the first cloud-set-top-box instance CSTB1 and the second cloud-set-top-box instance CSTB2 have two identical separate executable application parts for execution transmitted to the cloud-computing data-center CLOUD, namely the separate executable application parts responsible for obtaining image movie database information and social network comments and for the subsequent converting of the information and the comments into streams.

After identifying that separate executable application parts of the first and second cloud-set-top-box instance CSTB1, CSTB2 are identical the cloud-computing data-center CLOUD only performs once the identical separate executable application part—obtaining image movie database information and social network comments and subsequent converting of the information and the comments into streams—and distributes the encoded multiplexed streams to the different cloud-set-top-box instances CSTB1 and CSTB2 each having a corresponding receiving interface for decoding the received multiplexed stream.

FIG. 8 therefore shows a replication of the output of an identical separate executable application part which is performed only once but its result/output is distributed among all cloud-set-top-box instances CSTB1, CSTB2 which have transmitted the same separate executable application part for execution to the cloud-computing data-center CLOUD.

Figure 9:
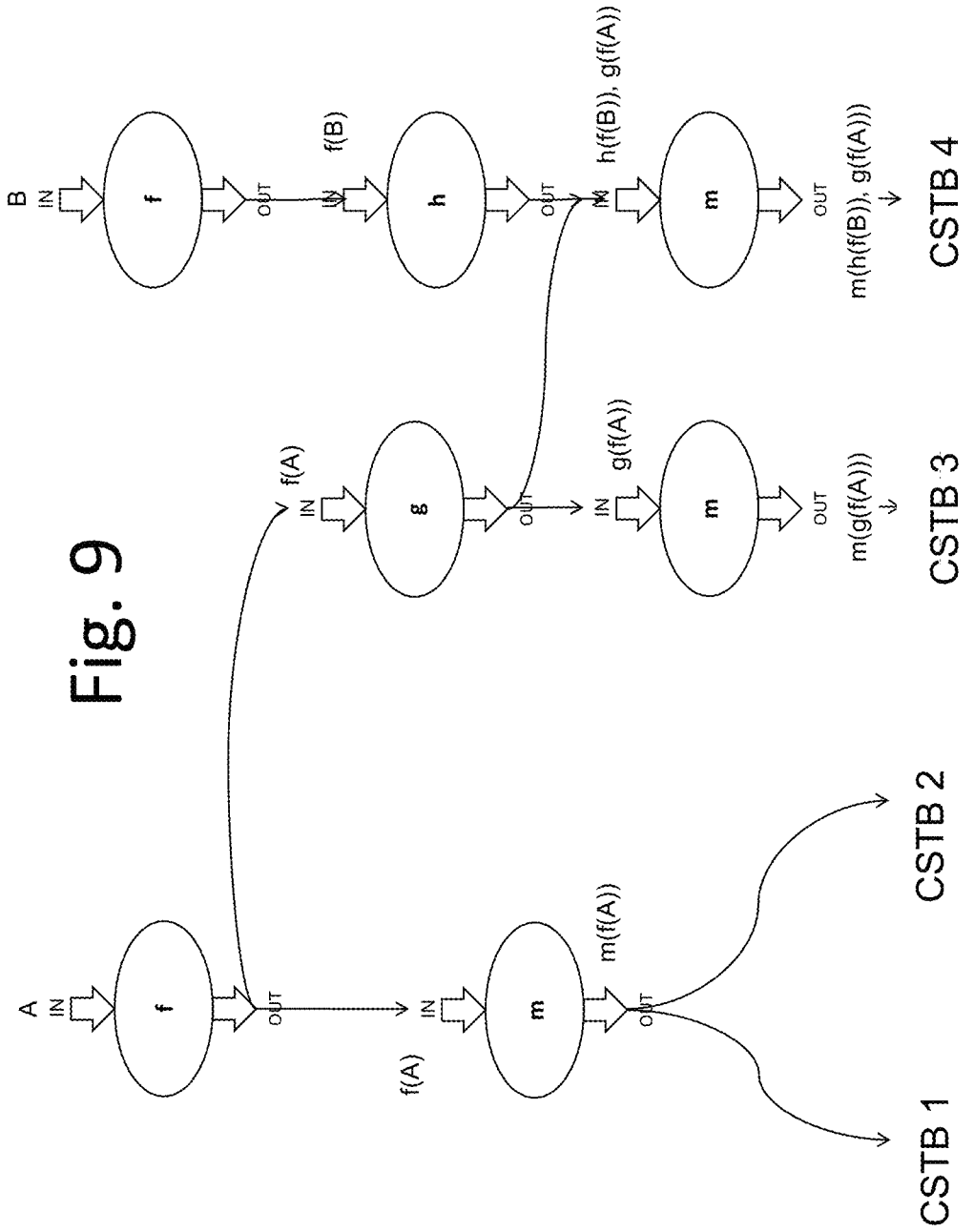
FIG. 9 shows a method according to a sixth embodiment of the present invention.

FIG. 9 shows a method according to a sixth embodiment of the present invention.

In FIG. 9 a further example for sharing resources of the cloud-computing data-center is shown in an abstract flowchart. For example data inputs A, B are to be processed to perform different functions, represented by reference signs f, g, h and m. A first and second cloud-set-top-box instance CSTB1 and CSTB2 request a result of the functions m and f: m(f(A)). A third cloud-set-top-box instance CSTB3 requests a result of m(g(f(A))) and a fourth cloud-set-top-box instance CSTB4 requires a result in form of m(h(f(B)), g(f(A))).

To provide the first cloud-set-top-box instance CSTB1 and the second cloud-set-top-box instance CSTB2 with the aforementioned data, data input A is processed by component f in the cloud-computing data-center CLOUD. The result of this processing is used as input for component m in the cloud-computing data-center CLOUD and the output of this processing m(f(A)) is then transmitted to the first and second cloud-set-top-box instance CSTB1 and CSTB2.

To provide the third cloud-set-top-box instance CSTB3 with the aforementioned corresponding result the already processed data input A with component f, f(A), is used as input for component g in the cloud-computing data-center CLOUD. The outputted result g(f(A)) is then on the one hand used as input for component m and the corresponding output of component m, namely m(g(f(A))) is then transmitted to the third cloud-set-top-box instance CSTB3.

On the other hand the outputted result of component g, namely g(f(A)) is used as input for component m together with the result of h(f(B)). The outputted result of component m(h(f(B)), g(f(A))) is then transmitted to the forth cloud-set-top-box instance CSTB4. Data input B is processed before in component f and the result f(B) is then used as input for component h in the cloud-computing data-center CLOUD and the processed result h(f(B)) is then used as additional input for component m together with g(f(A)) as mentioned before.

FIG. 9 shows therefore the use of inputs of components respectively separate executable application parts which are a result of an output of another component in general allowing a sharing of resources.

To illustrate component sharing the following table is presented.

| CSTB | Initial input(s) | Final output | Invoked functions/ components | conventional | Invention |
|------|------------------|--------------|-------------------------------|--------------|-----------|
| #1 | A | m(f(A)) | m, f | 2 | 1 |
| #2 | A | m(f(A)) | m, f | 2 | 1 |
| #3 | A | m(g(A)) | m, g | 3 | 1.5 |
| #4 | A, B | m(h(f(B)), g(f(A))) | m, h, g, f, f | 5 | 3.5 |
| TOTAL | | | | 12 | 7 |

According to the table and in connection with FIG. 9 components f, g, h and m are executed twelve times in summary if each cloud-set-top-box instance CSTB1, CSTB2, CSTB3 and CSTB4 operates conventionally, namely independent of every other cloud-set-top-box component. By sharing outputs of some components in particular f(A), m(f(A)) and g(f(A)) the number of executions of the different components respectively separate executable application parts f, g, h and m is reduced to seven executions instead of twelve executions conventionally.

The cloud-set-top-box instances CSTB1 and CSTB2 have identical application parts to be executed on the cloud-computing data-center, which are represented by components m and f and the data input A is also identical, so the entire application part is shared among these. On the other hand the third and fourth cloud-set-top-box instances CSTB3 and CSTB4 share some components with other cloud-set-top-box instances CSTB1, CSTB2, CSTB3 and CSTB4 but not the application part located in the cloud-computing data-center CLOUD.

FIG. 10 shows task division and synchronization of a cloud-computing data-center operation with a set-top-box operation according to a seventh embodiment of the present invention.

In a first step S1 requirements of an application that is the capabilities required to execute the application are determined. The application source code is analyzed for it in order to separate functional parts of the application into components or separate executable applications parts along lines of data-flow of the entire application. These components are then connected up, for example in form of an execution graph G(C; E) with vertices C corresponding to the different components and edges E representing the data-flow of the entire application.

The execution graph G may contain cycles, for example if two components exchange data during the course of execution of the application. If there are multiple data exchanges between two components then a corresponding amount of edges is inserted into the execution graph G. Components with multiple cycles preferably remain on the same hardware, i.e. on the set-top-box or on the cloud-computing data-center to avoid network latency of exchanging data multiple times over the network.

In a second step S2 these cycles are removed from the execution graph G by merging components with cycles between them into larger components, for example as shown and described in FIG. 7. To identify component candidates to be merged a parameter specifying a minimum number of cycles between different components is evaluated. For example if this parameter is specified as 0 then the execution graph G is made a directed acyclic graph DAG via a corresponding merge operation. In case of a directed acyclic graph DAG a topological ordering of the execution graph G corresponds to the serialized ordering of the data-flow of the application.

After obtaining the components as described in the previous steps S1 and S2, in a third step S3 a task divider analyzes each separate component to determine which components are a necessary part of the physical set-top-box, in other words which separate executable application parts have to be executed on the set-top-box. For example an image buffer writing out a visual output of the application needs to be part of the set-top-box.

After factoring out all components which need to be placed on the physical set-top-box the task divider in a fourth step S4 consults a set-top-box capability database to ensure that the set-top-box is capable of executing these minimum set-top-box components as needed by the application. For example if the application is a game requiring user feedback and the set-top-box is not capable of user input then the task divider will issue a error signal stopping the application from being deployed, i.e. it is simply not possible to implement this application using this set-top-box.

On the other hand the task divider may also insert components into the execution graph G to enable an application execution if applicable: For example if an application only permits a certain digital rights management algorithm with which the set-top-box is not equipped to decode, the digital rights management decoding can be performed on the cloud-computing data-center. Another example is, if the application only outputs a H.264 stream whereas the set-top-box is only capable of decoding a MPEG2 stream. The task divider will then insert a transcoding component in a fifth step S5 into the execution graph G of the application converting the H.264 output into MPEG2 output. The task divider is able therefore to adapt applications depending on heterogeneous capabilities of different set-top-boxes by inserting additional components when needed.

In case the execution graph G is not a directed acyclic graph, i.e. some cycles were left inside, a topological ordering is not possible. It is preferred that all connected components of the execution graphs vertices C having cycles are placed and executed on the same physical hardware, i.e. either on the set-top-box or the cloud-computing data-center avoiding network latency/round trips during data-flow. Optionally a manual override is provided in case an application developer wants to separate vertices of a connected/combined component. In an interactive gaming application a user input for example would probably fed-back high up in the topological ordering creating a cycle encompassing a large number of components. In this case rather then simply deploying these components on the set-top-box the manual override may be used to divide components in the cycle and thereby inserting a network uplink of user interaction but dividing the components in a more efficient way.

After the execution graph G is adapted and in place, the task divider starts in a sixth step S6 placing the component closest to a final sink of the execution graph G on the set-top-box traversing the topological ordering backwards subject to the set-top-box and cloud-computing data-center capability. User input components cannot for example be placed on the cloud-computing data-center. Once the capability of the set-top-box is exhausted, for example no more memory or no more free central processing unit resource is available the remainder of the components are marked in a seventh step S7 to be executed on the cloud-computing data-center.

After marking out the division of these components, the task divider constructs in an eights step S8 containers for each component with data inputs and data outputs being exposed to the outside via standard interfaces, such as stream socket sources and sinks. Containers are in general independently executable entities respectively application parts that may be compiled or interpreted on a target platform like the set-top-box or the cloud-computing data-center. They are remotely controlled by a task synchronizer. In each container in a ninth step S9 buffers and timeouts based on the execution graph G to synchronize operation and to smooth out asynchronous delays and distributed execution requirements of the cloud-set-top-box are implemented.

Finally in a tenth step S10 the application is deployed in form of connected containers on the hardware of the set-top-box and the cloud-computing data-center.

To summarize each cloud-set-top-box or more precisely cloud-set-top-box instance is a dynamically created distributed entity which may scale up to requirements of complex applications by utilizing resources of a cloud-computing data-center. Multiple cloud-set-top-box instances are orchestrated to detect any duplicate task being undertaken in the cloud-computing data-center. The detected duplicate task is only performed once and its result may be copied across all the requesting cloud-set-top-box instances providing efficiency to conventional set-top-boxes. Applications are divided into functional components respectively containers, i.e. a separate executable application part whose output may be shared across different cloud-set-top-box instances, preferably by memory copy in the case components run on a same physical cloud computer of the cloud-computing data-center or by multicast in case components run on different cloud computers of the cloud-computing data-center.

Functional components may also be moved between set-top-boxes and the cloud-computing data-center dynamically and in real-time allowing applications or parts of applications to be executed in the set-top-box or in the cloud-computing data-center depending on capabilities of the corresponding set-top-boxes and preferably real time demand of resources. Cloud-computing data-centers are more easily extensible by additional hardware and/or software resources, for example central processing unit, graphic processing unit, storage, networking resources or the like. Upgrading the cloud-computing data-center can be more easier performed than those of conventional set-top-boxes of each user.

Further the present invention enables a more easier access of professional television content for a mobile smartphone, a tablet PC or the like used by a user to view media content: A corresponding cloud-set-top-box instance may then be provided in form of a cloud-computing data-center component.

The present invention further provides a dynamic and real time division of tasks between set-top-boxes and cloud-computing data-centers enabling for example freeing up of resources in the cloud-computing data-center when processing may be performed inside corresponding set-top-boxes. These resources may then be used to serve other cloud-set-top-box instances. The present invention further enables more complex applications, in particular software application to compose or combine content from multiple sources for each individual user on demand and in real time.

A further advantage is that centralizing content head-end sub-systems at the cloud-computing data-center enables users to access any content on any underlying transport protocol from any service provider even if they do not own a set-top-box capable of decoding this content or even if they do not have access to the corresponding transport network used by a particular services provider.

The present invention further enables sharing an output of whole applications or parts thereof on cloud-set-top-box instances. The present invention further enables discovering communalities between application components that enable to share output of whole applications leading to an efficient resource usage and a prevention of duplicate processing. The present invention further enables running application irrespective of set-top-box capability by dynamically distributing workload among the cloud-computing data-center and set-top-boxes.

The present invention further provides upgrading the usefulness of legacy set-top-box hardware via augmented processing in the cloud-computing data-center. The present invention even further provides an automatic insertion of components to enable cloud-set-top-box instance execution when required enabling applications determined for the set-top-box to be distributed between the set-top-box and the cloud-set-top-box instance respectively the cloud-computing data-center.

The present invention even further provides algorithmic task division, scalability and sharing of underlying set-top-box resources and cloud-computing data-center resources preferably based on parsing application code, representing it as an execution graph and then collapsing the execution graph until a topological sorting preferably free of cycles can be constructed. Outputs of applications and/or of functional components of applications being executed in the cloud-computing data-center create efficiencies in the cloud-computing data-center resource usage by detecting and preventing a duplication of tasks requested by the same or different applications executing on different cloud-set-top-boxes.

The present invention further enables scaling up application complexity on set-top-boxes irrespective of capabilities of set-top-box hardware in part due to the economical usage of cloud-computing data-center computing resources.

Even further the present invention provides scaling up user numbers and devices having access to content from multiple service providers. A fair share of cloud-computing data-center resources among users based on state link updates may be provided.

The present invention further enables content providers and service providers to develop innovative applications around content, free of hardware limitations, in particular of the hardware of set-top-boxes. Users are enabled to use multiple devices such as mobile smart phones, tablet PCs or the like for accessing content from multiple sources via configurable applications. Synchronizing and distribution tasks on the basis of the hardware and software capabilities of the set-top-boxes and cloud-computing data-centers are provided in the manner being transparent to overlaid applications.

Resource usage in the cloud-computing data-center is regulated dynamically taking into account capabilities of hardware and the resources requested by the deployed cloud-set-top-box instance applications according to the present invention.

One of the further advantages of the present invention is, that complicated applications may be run by offloading tasks to the cloud-computing-data-center when required. Further execution of duplicate tasks is avoided when possible.

The present invention enhances flexibility allowing users access content from any service provider without having to install non-standard hardware for every service provider for example a user may pay to subscribe to service provider for just a view hours to get access to particular content being offered by that service provider without having to buy further hardware.

The present invention provides further content and/or service providers to serve any user in a manner protecting their content from unauthorized access when content head-end sub-systems are centralized at their cloud-computing data-center.

The present invention provides an abstraction out of the underlying heterogeneous hardware and software equipment available at users premises and instead allowing applications developers to create one application that can be executed irrespective of underlying hardware and transport protocols.

The present invention further enables a user to use other devices like table PCs, laptops, mobile smart phones and personal computers to access content beyond conventional set-top-boxes. A whole set-top-box functionality can be implemented on the cloud-computing data-center for this purpose if needed.

A further advantage of the present invention is to allow users to access content on the move when they are not within their premises. An even further advantage is to provide and to make advanced services by IP TV, cable and other media providers available to their entire customer base even in presence of set-top-boxes of different characteristics. CPU or memory intensive services can be run in the cloud-computing data-center for those users having a low-end device.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for managing an application on a home user equipment (303), preferably a set-top-box of a television, characterized by the steps of
   a) Dividing the application into at least one separate executable application part,
   b) Determining for each separate executable application part whether to be executed on the home user equipment (303) or on a computational entity (301), located in the internet,
   c) Transferring application parts determined for execution on the computational entity (301) according to step b) to the computational entity (301),
   d) Executing transferred application parts on the computational entity (301),
   e) Returning results of executed application parts to the home user equipment (303), and
   f) Synchronising returned results with results of separate application parts executed on the home user equipment (303).

2. The method according to claim 1, characterized in that identical application parts transferred to the computational entity (301) from different home user equipment (303) are identified, wherein one of the identical application parts is executed by the computational entity (301) and a result of this execution of the one identical application part is returned to each of the different home user equipment (303).

3. The method according to claim 2, characterized in that identical application parts are identified by identical inputs and identical execution information, preferably execution code.

4. The method according to claim 1, characterized in that at least one of the steps a)-c) includes analysing a source code of the application.

5. The method according to claim 1, characterized in that at least one of the steps a)-c) includes analysing a data flow of the application.

6. The method according to claim 1, characterized in that computational requirements of an application for execution on the home user equipment (303) are identified and separate executable application parts exceeding solely or cumulatively computational requirements of the home user equipment (303) are determined for execution on the computational entity (301).

7. The method according to claim 1, characterized in that step b) includes determining a physical requirement to be executed on the home user equipment (303).

8. The method according to claim 1, characterized in that an output of a first application part is used as input for a second application part executed on the computational entity (301), preferably wherein the first and second application part correspond to different applications on separate home user equipment (303).

9. The method according to claim 1, characterized in that the home user equipment (303) provides connector means for enabling an entire application to be executed on the computational entity (301).

10. The method according to claim 1, characterized in that separate executable application parts are provided with common data input and data output ports.

11. The method according to claim 1, characterized in that data exchange cycles between different executable application parts are identified and based on this identification these application parts are either determined for execution on the home user equipment (303) or on the computational entity (301).

12. System for managing an application on a home user equipment (303), preferably for executing a method according to claim 1, comprising a home user equipment (303), preferably a set-top-box of a television and
- a computational entity (301), located in the internet, comprising each an input interface and an output interface (202, 411) for communication with each other, characterized in that
- the computational entity (301) comprises
- a task divider (412) for dividing the application into separate executable application parts and for determining for each separate executable application part whether to be executed on the home user equipment (303) or on the computational entity (301),
- communication means for transferring application parts determined for execution on the computational entity to the computational entity via the input and output interfaces (202, 411) and for returning results of executed application parts to the home user equipment (303) via the input and output interfaces (202, 411),
- a processor (413) for executing transferred application parts on the computational entity (301), and
- a synchronizer for synchronising returned results with results of separate application parts executed on the home user equipment (303).

13. The system according to claim 12, characterized in that the computational entity (301) further comprises a multiplexer (414) for mixing input and results of separate executable application parts.

* * * * *